(12) United States Patent
Alsharif et al.

(10) Patent No.: US 11,327,652 B2
(45) Date of Patent: *May 10, 2022

(54) KEYBOARD AUTOMATIC LANGUAGE IDENTIFICATION AND RECONFIGURATION

(71) Applicant: Google LLC, Mountain View, CA (US)

(72) Inventors: Ouais Alsharif, Mountain View, CA (US); Peter Ciccotto, Cupertino, CA (US); Francoise Beaufays, Mountain View, CA (US); Dragan Zivkovic, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/989,420

(22) Filed: Aug. 10, 2020

(65) Prior Publication Data

US 2020/0371686 A1    Nov. 26, 2020

Related U.S. Application Data

(63) Continuation of application No. 15/422,175, filed on Feb. 1, 2017, now Pat. No. 10,747,427.

(51) Int. Cl.
*G06F 3/04886* (2022.01)
*G06F 3/023* (2006.01)
(Continued)

(52) U.S. Cl.
CPC ........ *G06F 3/04886* (2013.01); *G06F 3/0237* (2013.01); *G06F 40/263* (2020.01); *G06F 40/274* (2020.01)

(58) Field of Classification Search
CPC .. G06F 3/04886; G06F 3/0237; G06F 40/263; G06F 40/274
See application file for complete search history.

(56) References Cited

U.S. PATENT DOCUMENTS 6,061,057 A    5/2000  Knowlton et al.
6,216,102 B1   4/2001  Martino et al.
(Continued)

OTHER PUBLICATIONS

"Final Office Action", U.S. Appl. No. 15/422,175, dated Dec. 31, 2019, 20 Pages.
(Continued)

*Primary Examiner* — Kavita Stanley
*Assistant Examiner* — Phoebe X Pan
(74) *Attorney, Agent, or Firm* — Colby Nipper PLLC

(57) ABSTRACT

A keyboard is described that determines, using a first decoder and based on a selection of keys of a graphical keyboard, text. Responsive to determining that a characteristic of the text satisfies a threshold, a model of the keyboard identifies the target language of the text, and determines whether the target language is different than a language associated with the first decoder. If the target language of the text is not different than the language associated with the first decoder, the keyboard outputs, for display, an indication of first candidate words determined by the first decoder from the text. If the target language of the text is different: the keyboard enables a second decoder, where a language associated with the second decoder matches the target language of the text, and outputs, for display, an indication of second candidate words determined by the second decoder from the text.

20 Claims, 9 Drawing Sheets

(51) Int. Cl.
    *G06F 40/263* (2020.01)
    *G06F 40/274* (2020.01)

(56) References Cited

U.S. PATENT DOCUMENTS

| | | |
|---|---|---|
| 6,314,565 B1 | 11/2001 | Kenner et al. |
| 6,334,101 B1 | 12/2001 | Hetherington et al. |
| 6,421,726 B1 | 7/2002 | Kenner et al. |
| 6,629,073 B1 | 9/2003 | Hon et al. |
| 7,035,788 B1* | 4/2006 | Nakajima ............ G06F 40/216 704/231 |
| 7,257,775 B1 | 8/2007 | Jivakov et al. |
| 8,311,824 B2 | 11/2012 | Lubowich et al. |
| 8,788,259 B1 | 7/2014 | Buryak et al. |
| 8,832,188 B1 | 9/2014 | Cierniak |
| 8,838,437 B1 | 9/2014 | Buryak et al. |
| 9,002,699 B2 | 4/2015 | Qin |
| 9,317,605 B1 | 4/2016 | Zivkovic et al. |
| 9,372,848 B2 | 6/2016 | Bojja et al. |
| 9,536,522 B1 | 1/2017 | Hall et al. |
| 9,715,490 B2 | 7/2017 | Bolshinsky et al. |
| 9,842,101 B2* | 12/2017 | Wang ................ G06F 40/274 |
| 9,842,105 B2 | 12/2017 | Bellegarda |
| 9,946,789 B1 | 4/2018 | Li |
| 9,953,088 B2 | 4/2018 | Gruber et al. |
| 10,049,668 B2 | 8/2018 | Huang et al. |
| 10,078,631 B2 | 9/2018 | Bellegarda |
| 10,127,220 B2 | 11/2018 | Bellegarda et al. |
| 10,163,436 B1 | 12/2018 | Slifka et al. |
| 10,417,350 B1* | 9/2019 | Mohamed ............ G06N 20/00 |
| 10,747,427 B2 | 8/2020 | Alsharif et al. |
| 2003/0023420 A1 | 1/2003 | Goodman |
| 2004/0148362 A1 | 7/2004 | Friedman |
| 2008/0077393 A1* | 3/2008 | Gao ................ G06F 3/0236 704/8 |
| 2009/0077464 A1* | 3/2009 | Goldsmith ............ G06F 40/129 715/257 |
| 2009/0113299 A1* | 4/2009 | Chung ................ G06F 3/018 715/702 |
| 2009/0170536 A1 | 7/2009 | Rang et al. |
| 2010/0145694 A1 | 6/2010 | Ju et al. |
| 2012/0029902 A1 | 2/2012 | Lu et al. |
| 2012/0239834 A1* | 9/2012 | Davtchev ............ G06F 40/263 710/67 |
| 2012/0251413 A1 | 10/2012 | Varma et al. |
| 2013/0046544 A1* | 2/2013 | Kay ................ G06F 3/023 345/169 |
| 2013/0238336 A1 | 9/2013 | Sung et al. |
| 2013/0346065 A1* | 12/2013 | Davidson ............ G06F 40/263 704/8 |
| 2014/0035823 A1 | 2/2014 | Khoe et al. |
| 2014/0214405 A1* | 7/2014 | Ouyang ............ G06F 3/04886 704/9 |
| 2015/0095017 A1 | 4/2015 | Mnih et al. |
| 2015/0262078 A1 | 9/2015 | Sarikaya et al. |
| 2015/0309984 A1* | 10/2015 | Bradford ............ G06F 40/263 704/8 |
| 2015/0379429 A1 | 12/2015 | Lee et al. |
| 2016/0092160 A1* | 3/2016 | Graff ................ G06F 3/167 704/257 |
| 2016/0267905 A1 | 9/2016 | Levit et al. |
| 2017/0024372 A1 | 1/2017 | Bojja et al. |
| 2017/0316053 A1* | 11/2017 | Lopiano ............ G06F 16/3338 |
| 2017/0357640 A1 | 12/2017 | Bellegarda et al. |
| 2018/0129413 A1* | 5/2018 | Berger ................ G06F 3/0238 |
| 2018/0150448 A1* | 5/2018 | Gupta ................ G06F 40/295 |
| 2018/0188948 A1 | 7/2018 | Ouyang et al. |
| 2018/0217749 A1 | 8/2018 | Alsharif et al. |
| 2018/0300364 A1 | 10/2018 | Xu |
| 2018/0349489 A1* | 12/2018 | Toudji ................ G06F 40/205 |
| 2019/0227980 A1* | 7/2019 | McMahan ................ G06F 8/65 |
| 2019/0361977 A1 | 11/2019 | Crudele et al. |
| 2019/0370342 A1 | 12/2019 | Luke et al. |
| 2021/0343487 A1* | 11/2021 | Liu ................ H01H 13/14 |

OTHER PUBLICATIONS

"Non-Final Office Action", U.S. Appl. No. 15/422,175, dated Jun. 3, 2019, 13 pages.

"Notice of Allowance", U.S. Appl. No. 15/422,175, 7 Pages.

"Perplexity", Wikipedia, 2016, 3 pages.

Gillick, et al., "Multilingual Language Processing From Bytes", 2016, 3 pages.

* cited by examiner

KEYBOARD AUTOMATIC LANGUAGE IDENTIFICATION AND RECONFIGURATION

RELATED APPLICATIONS

This application is a continuation application of U.S. patent application Ser. No. 15/422,175, filed Feb. 1, 2017, and titled "Keyboard Automatic Language Identification and Reconfiguration," the disclosure of which is incorporated in its entirety by reference herein.

BACKGROUND

Some graphical keyboards may rely on one or more models to determine what graphical keys a user may be selecting and/or what word or words the user may be typing, when providing input at the graphical keys. For example, a graphical keyboard may use a language model, a spatial model, and/or other model to perform tasks such as auto-correction, auto-completion, key selection, character, word or phrase prediction, and other keyboard input related tasks. Some models may be tailored to a particular language. In other words, some models may be configured to discern input assuming that a user is typing in a particular language. If a graphical keyboard tries to discern user input while the user is typing in a language that is different from what a model is expecting, the keyboard may exert abnormal or incorrect behavior resulting in errors in decoding input and/or a frustrating user experience.

SUMMARY

In general, this disclosure is directed to techniques for enabling a graphical keyboard to automatically determine one or more target languages associated with user input and, either automatically or in response to receiving a user input to a prompt requesting instructions to do change the active language decoder, reconfigure itself to enable language decoding in each of the one or more target languages. For example, a graphical keyboard of a graphical user interface (GUI) of a computing device may default to using an initial language decoder (e.g., a language model, a spatial model, and/or other type of model used to determine text from user input at a graphical keyboard) as a current decoder for decoding user inputs. The current language decoder may be configured to translate keyboard inputs into text of a default language, such as a language associated with a geographic location at which the computing device was sold and/or manufactured. A user of the computing device may provide inputs to the graphical keyboard to intentionally create text written in one or more target languages that differ from the language of the current decoder.

After receiving explicit consent to make use of and/or analyze information about the user of the computing device, and to enable more accurate input decoding, the graphical keyboard may use a language identification module (e.g., a machine-learned model) trained to determine whether any of the one or more target languages are unsupported by the current decoder, and if so, reconfigure itself to change decoders such that the graphical keyboard may decode inputs in the otherwise unsupported target language. In response to determining an unsupported target language, the graphical keyboard may generate a prompt (e.g., a graphical and/or audible alert) alerting the user to the option of reconfiguring the graphical keyboard to be able to decode inputs in the otherwise unsupported target languages. In other examples, the graphical keyboard may automatically reconfigure itself to without alerting the user. Once reconfigured, the graphical keyboard may automatically switch between multiple different decoders for subsequent user inputs so that the graphical keyboard uses the particular decoder associated with the target language determined by the language identification module. If the decoder associated with any of the one or more target languages is not currently installed as part of the graphical keyboard, the graphical keyboard may automatically download and/or install the different decoder (e.g., from a data repository at a remote server) without requiring the user to navigate through a menu of settings and options to download and install a new keyboard decoder and/or to toggle between keyboards of different languages.

By learning when and how to automatically reconfigure itself to be able to decode user inputs in multiple target languages, the graphical keyboard described herein may avoid incorrectly decoding user inputs and therefore reduce the number of user inputs required to perform text-entry. Exhibiting more accurate behavior and receiving fewer user inputs may simplify the user experience and may reduce power consumption of the computing device.

In one example, a method includes outputting, by a keyboard application executing at a computing device, for display, a graphical keyboard; determining, by the keyboard application, using a first decoder and based on a selection of one or more keys of the graphical keyboard, text; responsive to determining that a characteristic of the text satisfies a threshold for determining a target language of the text, and determining, by a machine-learned model of the keyboard application, the target language of the text. The method further includes, if the target language of the text is not different than a language associated with the first decoder, outputting, by the keyboard application, for display, an indication of one or more first candidate words determined by the first decoder from the text; and if the target language of the text is different than the language associated with the first decoder: enabling, by the keyboard application, a second decoder, wherein a language associated with the second decoder matches the target language of the text; and outputting, by the keyboard application, for display, an indication of one or more second candidate words determined by the second decoder from the text.

In another example, a mobile computing device includes at least one processor, and a memory. The memory stores instructions for a keyboard application that when executed cause the at least one processor to: output, for display at the presence-sensitive display, a graphical keyboard; determine, using a first decoder and based on a selection of one or more keys of the graphical keyboard, text; responsive to determining that a characteristic of the text satisfies a threshold for determining a target language of the text, determine, using a machine-learned model, the target language of the text. The instructions, when executed, further cause the at least one processor to, if the target language of the text is not different than a language associated with the first decoder, output, for display at the presence-sensitive display, an indication of one or more first candidate words determined by the first decoder from the text; and if the target language of the text is different than the language associated with the first decoder: enable, a second decoder, wherein a language associated with the second decoder matches the target language of the text; and output, for display at the presence-sensitive display, an indication of one or more second candidate words determined by the second decoder from the text.

In another example, a computer-readable storage medium encoded with instructions that, when executed by at least one processor of a computing device, cause the at least one processor to output, for display at the presence-sensitive display, a graphical keyboard; determine, using a first decoder and based on a selection of one or more keys of the graphical keyboard, text; responsive to determining that a characteristic of the text satisfies a threshold for determining a target language of the text, determine, using a machine-learned model, the target language of the text. The instructions, when executed, further cause the at least one processor to, if the target language of the text is not different than a language associated with the first decoder, output, for display, an indication of one or more first candidate words determined by the first decoder from the text; and if the target language of the text is different than the language associated with the first decoder: enable, a second decoder, wherein a language associated with the second decoder matches the target language of the text; and output, for display, an indication of one or more second candidate words determined by the second decoder from the text.

In another example, a system includes means for outputting, for display, a graphical keyboard; means for determining, using a first decoder and based on a selection of one or more keys of the graphical keyboard, text; responsive to determining that a characteristic of the text satisfies a threshold for determining a target language of the text, and means for determining, by a machine-learned model, the target language of the text. The system further includes, if the target language of the text is not different than a language associated with the first decoder, means for outputting, for display, an indication of one or more first candidate words determined by the first decoder from the text; and if the target language of the text is different than the language associated with the first decoder: means for enabling a second decoder, wherein a language associated with the second decoder matches the target language of the text; and means for outputting, for display, an indication of one or more second candidate words determined by the second decoder from the text.

The details of one or more examples are set forth in the accompanying drawings and the description below. Other features, objects, and advantages of the disclosure will be apparent from the description and drawings, and from the claims.

DETAILED DESCRIPTION

Figure 1A:
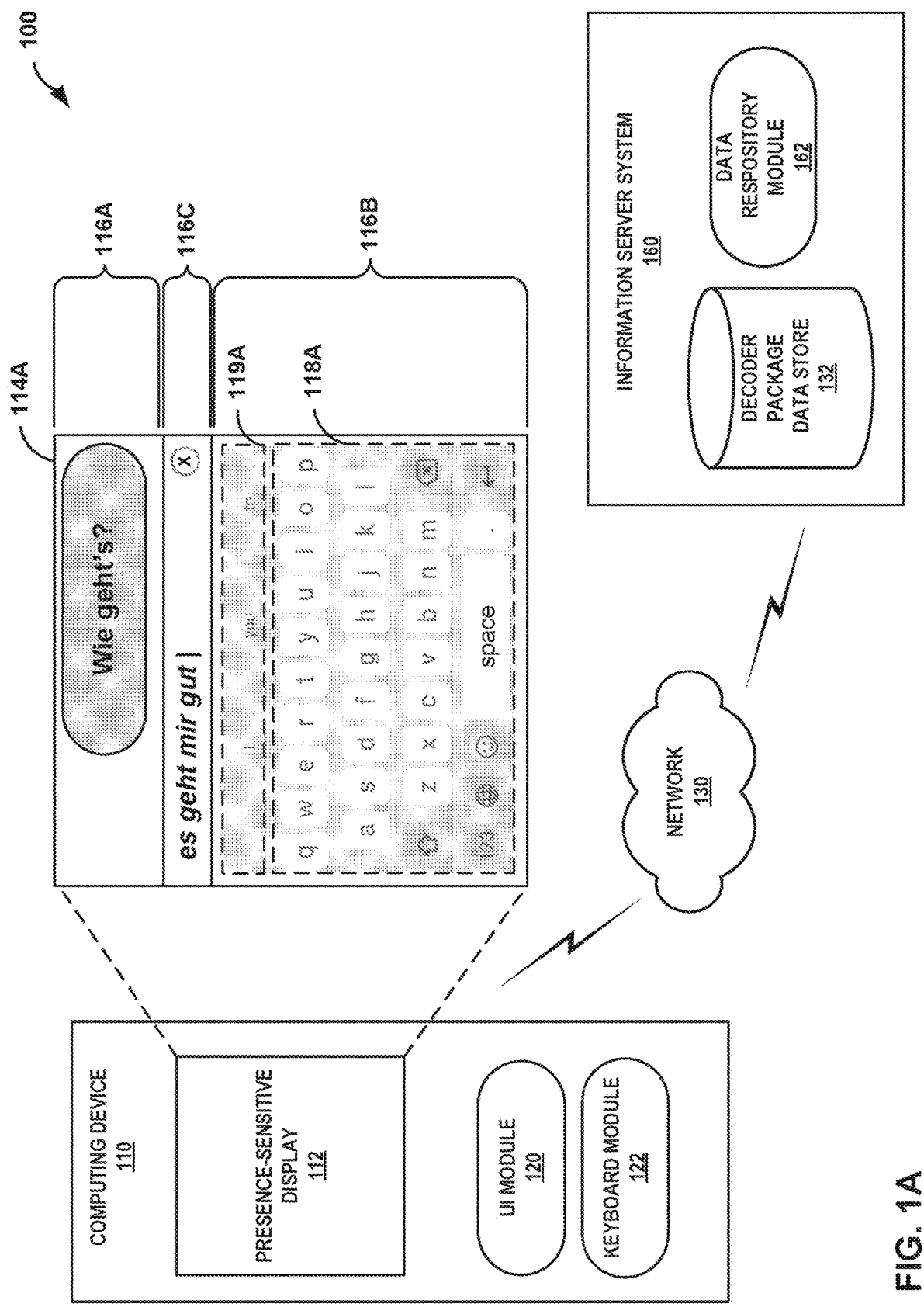
FIGS. 1A-1C are conceptual diagrams illustrating a system including a computing device that executes an example graphical keyboard configured to automatically reconfigure itself to decode user inputs into text of a target language determined based on the user inputs, in accordance with one or more aspects of the present disclosure.
Figure 1B:
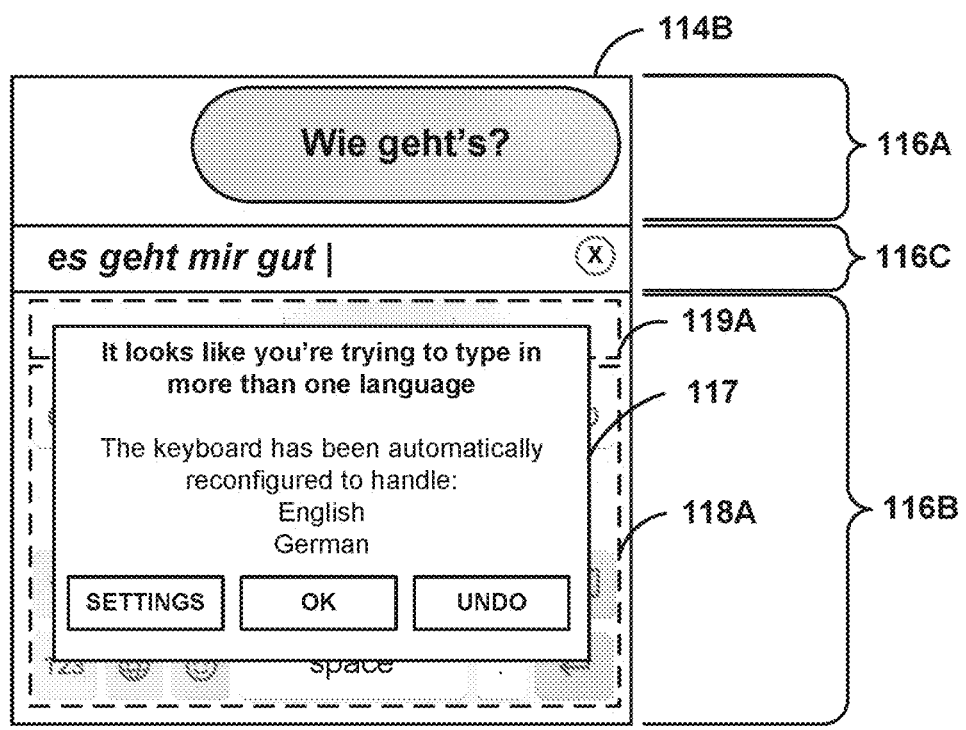
Figure 1C:
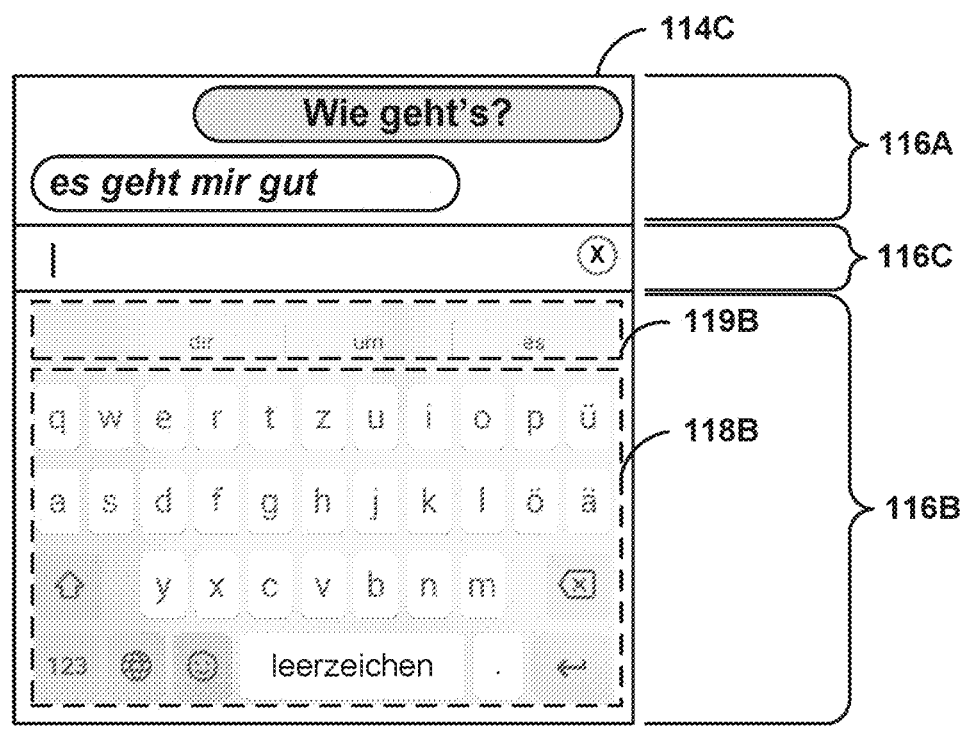

FIGS. 1A-1C are conceptual diagrams illustrating a system including a computing device that executes an example graphical keyboard configured to automatically reconfigure itself to decode user inputs into text of a target language determined based on the user inputs, in accordance with one or more aspects of the present disclosure. System 100 includes information server system ("ISS") 160 in communication with computing device 110 via network 130.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ISS 160 and computing device 110. Computing device 110 and ISS 160 may transmit and receive data across network 130 using any suitable communication techniques.

ISS 160 and computing device 110 may each be operatively coupled to network 130 using respective network links. The links coupling computing device 110 and ISS 160 to network 130 may be Ethernet, ATM or other types of network connections, and such connections may be wireless and/or wired connections.

ISS 160 represents any suitable remote computing system, such as one or more desktop computers, laptop computers, mainframes, servers, cloud computing systems, etc. capable of sending and receiving information both to and from a network, such as network 130. ISS 160 hosts (or at least provides access to) a service for providing a computing device, such as computing device 110, access information that is available (e.g., data) for download, install, and execution by the computing device. In some examples, ISS 160 represents a cloud computing system that is accessible via network 130. For example, computing device 110 (e.g., UI module 120 and/or keyboard module 122) may communicate with ISS 160 via network 130 to access the prediction service provided by ISS 160. In the example of FIG. 1, ISS 160 includes data repository module 162 and decoder package data store 132.

Module 162 may perform operations described using software, hardware, firmware, or a mixture of hardware, software, and firmware residing in and/or executing at ISS 160. ISS 160 may execute module 162 with multiple processors or multiple devices. ISS 160 may execute module 162 as a virtual machine executing on underlying hardware, as one or more services of an operating system or computing platform of ISS 160, and/or as one or more executable programs at an application layer of a computing platform of ISS 160.

Data repository module 162 may provide a digital distribution platform related to computing software, including software stored as one or more decoder packages at decoder package data store 132. A decoder package may include one or more models (e.g., language model, spatial model, etc.), decoders, and/or other data necessary for a graphical keyboard to display a graphical keyboard layout and decode input detected at the keyboard layout into text of a particular written language.

Data repository module 162 may transmit data (e.g., one or more decoder packages) via network 130 in response to a request for data from a computing device, such as computing device 110. Upon receipt, the computing device may install the data in memory and/or execute instructions of the data at a local processor of the computing device. For example, data repository module 126 may enable a user of computing device 110 to browse, search, select, purchase and/or cause computing device 110 to download and install one or more decoder packages stored at decoder package data store 132. In some examples, repository module 126 may include information about the data stored at decoder package data store 132, such as a description of each decoder package and/or user comments and reviews of each decoder package. Data repository module 126 may send information about one or more decoder packages to computing device 110 so that computing device 110 may display the information to a user of the computing device 110.

Computing device 110 represents an individual mobile or non-mobile computing device. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), or any other type of portable computing device, a personal digital assistants (PDA), portable gaming systems, media players, e-book readers, mobile television platforms, automobile navigation systems, automobile and/or home entertainment and infotainment systems, counter-top or mobile assistant devices (e.g., an "always listening" home assistant devices), or any other types of mobile, non-mobile, wearable, and non-wearable computing devices configured to receive information via a network, such as network 130.

Computing device 110 includes presence-sensitive display (PSD) 112, user interface (UI) module 120, and keyboard module 122. Modules 120-122 may perform operations described using software, hardware, firmware, or a mixture of hardware, software, and firmware residing in and/or executing at respective computing device 110. Computing device 110 may execute modules 120-122 with multiple processors or multiple devices. Computing device 110 may execute modules 120-122 as virtual machines executing on underlying hardware. Modules 120-122 may execute as one or more services of an operating system or computing platform. Modules 120-122 may execute as one or more executable programs at an application layer of a computing platform.

PSD 112 of computing device 110 may function as an input and/or output device for computing device 110 and may be implemented using various technologies that enables computing device 110 to provide a user interface. PSD 112 may function as an input device using microphone technologies, infrared sensor technologies, presence-sensitive input screens, touchscreens (e.g., resistive touchscreens, surface acoustic wave touchscreens, capacitive touchscreens, projective capacitance touchscreens, acoustic pulse recognition touchscreens), pressure sensitive screens, or other input device technology for use in receiving user input. PSD 112 may function as an output (e.g., display) device using any one or more display devices (e.g., liquid crystal displays (LCD), dot matrix displays, light emitting diode (LED) displays, organic light-emitting diode (OLED) displays, e-ink, or similar monochrome or color displays capable of outputting visible information to a user of computing device 110), speaker technologies, haptic feedback technologies, or other output device technology for use in outputting information to a user.

PSD 112 may detect input (e.g., touch and non-touch input) from a user of respective computing device 110. PSD 112 may detect indications of input by detecting one or more gestures from a user (e.g., the user touching, pointing, and/or swiping at or near one or more locations of PSD 112 with a finger or a stylus pen). PSD 112 may output information to a user in the form of a user interface (e.g., user interfaces 114A-114C) which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interfaces 114A-114C (collectively referred to as "user interfaces 114") which, as shown in FIGS. 1A-1C, are graphical user interfaces of a chat application executing at computing device 110 and includes various graphical elements displayed at various locations of PSD 112.

As shown in FIGS. 1A-1C, user interfaces 114 are chat user interfaces, however user interfaces 114 may be any graphical user interface which includes a graphical keyboard. User interfaces 114 include output region 116A, graphical keyboard 116B, and edit region 116C. A user of computing device 110 may provide input at graphical keyboard 116B to produce textual characters within edit region 116C that form the content of the electronic messages displayed within output region 116A. The messages displayed within output region 116A form a chat conversation between a user of computing device 110 and a user of a different computing device.

UI module 120 may manage user interactions with PSD 112 and other input and output components of computing device 110 as the interactions relate to the user interface(s) provided by computing devices 110, including user interfaces 114. In other words, UI module 120 may act as an intermediary between various components of computing device 110 to make determinations based on user input detected by PSD 112 and generate output at PSD 112 in response to the user input. For example, UI module 120 may receive instructions from an application, service, platform, or other module of computing device 110 to cause PSD 112 to output a user interface (e.g., user interfaces 114). UI module 120 may send commands and/or instructions to PSD 112 that cause PSD 112 to output user interface 114 for display. UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard module 122 represents an application, service, or component executing at or accessible to computing device 110 that provides computing device 110 with a graphical keyboard configured to automatically reconfigure itself to decode user inputs into text of a target language that has been determined, by the graphical keyboard, from the user inputs. Keyboard module 122 may perform traditional, graphical keyboard operations used for text-entry, such as:

generating a graphical keyboard layout for display at PSD 112, mapping detected inputs at PSD 112 to selections of graphical keys, determining characters based on selected keys, or predicting or autocorrecting words and/or phrases based on the characters determined from selected keys. Keyboard module 122 is responsible for controlling operations associated with graphical keyboard 116B of user interfaces 114.

In some examples, keyboard module 122 may be a stand-alone application, service, or module executing at computing device 110 and, in other examples, keyboard module 122 may be a single, integrated sub-component thereof. For example, keyboard module 122 may be integrated into a chat or messaging application executing at computing device 110 whereas, in other examples, keyboard module 122 may be a stand-alone application or subroutine that is invoked by an application or operating platform of computing device 110 any time an application or operating platform requires graphical keyboard input functionality. If keyboard module 122 forms part of a chat or messaging application executing at computing device 110, keyboard module 122 may provide the chat or messaging application with text-entry capability. Similarly, if keyboard module 122 is a stand-alone application or subroutine that is invoked by an application or operating platform of computing device 110, any time an application or operating platform requires graphical keyboard input functionality, keyboard module 122 may provide the invoking application or operating platform with text-entry.

In some examples, computing device 110 may download and install keyboard module 122 from a data distribution platform (e.g., via the Internet) such as data repository module 162 of ISS 160 or some other service provider. In other examples, keyboard module 122 may be preloaded during production of computing device 110 or be installed as part of installation of an encompassing software package (e.g., an operating system).

Graphical keyboard 116B of user interfaces 114 includes graphical elements displayed as graphical keys 118A and 118B (collectively "graphical keys 118") and word suggestion regions 119A and 119B (collectively "word suggestion regions 119"). Keyboard module 122 may output information to UI module 120 that specifies the layout of graphical keyboard 116B within user interfaces 114. For example, the information may include instructions that specify locations, sizes, colors, characters, text, and other characteristics of graphical keys 118 and word suggestion regions 119. Based on the information received from keyboard module 122, UI module 120 may cause PSD 112 display graphical keyboard 116B as part of user interfaces 114.

Each character key of graphical keys 118A may be associated with a respective character (e.g., a letter, number, punctuation, or other character) displayed within the key or otherwise associated with the key. Each non-character key of graphical keys 118 may be associated with a function or command (e.g., emoji search, keyboard selector, etc.) of graphical keyboard 116B. A user of computing device 110 may provide input at locations of PSD 112 at which one or more of graphical keys 118 are displayed to cause computing device 110 to input content (e.g., text) into edit region 116C (e.g., for composing messages that are sent and displayed within output region 116A). Keyboard module 122 may receive information from UI module 120 indicating locations associated with input detected by PSD 112 that are relative to the locations of each of graphical keys 118. Using one or more decoders (e.g., a spatial model, language model, and/or other decoder component) keyboard module 122 may translate inputs at PSD 112 to selections of keys 118 and textual output (e.g., characters, words, and/or phrases of a language) at edit region 116C.

For example, PSD 112 may detect user inputs as a user of computing device 110 provides the user inputs at or near a location of PSD 112 where PSD 112 presents graphical keys 118. UI module 120 may receive, from PSD 112, an indication of the user input detected by PSD 112 and output, to keyboard module 122, information about the user input, such as an indication of one or more touch events (e.g., locations, pressure, and other information about the input).

Based on the information received from UI module 120, one or more decoders of keyboard module 122 may map detected inputs at PSD 112 to selections of graphical keys 118, determine characters based on selected keys 118, and predict or autocorrect words and/or phrases determined based on the characters associated with the selected keys 118. For example, a decoder of keyboard module 122 may include a spatial model that may determine, based on the locations of keys 118 and the information about the input, the most likely one or more keys 118 being selected. A language model of the decoder of keyboard module 122 may determine, based on the one or more keys 118 being selected, one or more characters, words, and/or phrases. In other words, a spatial model of a decoder of keyboard module 122 may determine a sequence of characters selected based on the one or more selected keys 118, and a language model of a decoder of keyboard module 122 may determine one or more the most likely candidate letters, morphemes, words, and/or phrases that a user is trying to input based on the most likely keys 118 being selected.

Keyboard module 122 may send the sequence of characters and/or candidate words and phrases to UI module 120 and UI module 120 may cause PSD 112 to present the characters and/or candidate words determined from a selection of one or more keys 118 as text within edit region 116C. In some examples, when functioning as a traditional keyboard for performing text-entry operations, and in response to receiving a user input at graphical keys 118 (e.g., as a user is typing at graphical keyboard 116B to enter text within edit region 116C), keyboard module 122 may cause UI module 120 to display the candidate words and/or phrases as one or more selectable spelling corrections and/or selectable word or phrase suggestions within a suggestion region 119 displayed adjacent to (e.g., above, below, or otherwise within graphical keyboard 116B) graphical keys 118.

While providing traditional keyboard functionality, keyboard module 122 may automatically determine one or more target languages associated with user input at graphical keyboard 116 and, either automatically or in response to prompting the user for instructions to do so, reconfigure itself to perform operations in the one or more target languages. For example, keyboard module 122 may default to using an initial language decoder (e.g., a language model, a spatial model, and/or other type of model used to determine text from user input at a graphical keyboard) as a current language decoder that is configured to translate keyboard inputs detected at PSD 112 into text of a default language (e.g., a language associated with a geographic location at which computing device 110 was sold and/or manufactured). Despite being configured to handle decoding in the default language, keyboard module 122 may receive user inputs detected by PSD 112 indicating that a user of computing device 110 is intentionally typing at graphical keyboard 116B to create text written in one or more target languages that differ from the default language.

A language identification module configured as a model (e.g., a machine-learned model) executing in the background of keyboard module 122 may be trained to determine what one or more target languages that a user is typing in, and whether any of the one or more target languages are unsupported by its decoder. For example, the language identification module may be trained offline based on keyboard inputs from other users of other computing devices when those other users are typing in a different target language than the language of the keyboard decoder. For instance, the language identification module may be trained to determine what types of inputs a user makes at an English language graphical keyboard when typing words in a language other than English (e.g., Danish, Dutch, French, German, etc.).

If the language identification module determines that a user is providing inputs to graphical keyboard 116B that differ from the language of the decoder(s) of keyboard module 122, keyboard module 122 may automatically reconfigure itself to decode inputs in that target language. For example, if a decoder associated with any of the one or more target languages is not currently installed as part of keyboard module 122, keyboard module 122 may automatically download and/or install the decoder needed to decode the target languages. Keyboard module 122 may communicate with data repository module 162 to obtain a decoder package for the target language(s) from data store 132. Keyboard module 122 may receive the decoder package via network 130 and install the decoder package—all without requiring a user of computing device 110 to navigate through a menu of settings and options to download and install a new keyboard decoder.

Once reconfigured, keyboard module 122 may automatically switch between its multiple decoders for subsequent user inputs so that keyboard module 122 always uses the particular decoder that works with the target language determined by the language identification module. For example, as keyboard module 122 receives information from UI module 120 about user inputs detected by PSD 112 at graphical keyboard 116B, the language identification module may initially determine a language associated with the user inputs. The language identification module may indicate to keyboard module 122 the target language of the input so that keyboard module 122 can automatically toggle to using the appropriate decoder for decoding the inputs. By learning when and how to automatically reconfigure itself to be able to decode user inputs in multiple target languages, keyboard module 122 may enable computing device 110 to avoid incorrectly decoding user inputs and therefore reduce the number of user inputs required to perform text-entry. Exhibiting more accurate behavior and receiving fewer user inputs may simplify the user experience of computing device 110 and may reduce power consumption of computing device 110.

In operation, a user may rely on computing device 110 to exchange text messages by providing inputs to PSD 112 while PSD 112 displays user interfaces 114. The user may be a native German speaker. Keyboard module 122 may be configured as an English based graphical keyboard application such that keyboard module 122 causes UI module 120 to display graphical keyboard 116B having English language type graphical keys 118A.

As shown in FIG. 1A, computing device 110 may receive a message from a device associated with a friend that states, in German, "Wie geht's?" which translated to English, means "How are you?" Computing device 110 may output user interface 114A for display which includes a message bubble with the message received from the device associated with the friend.

After viewing the message displayed at PSD 112, the user of computing device 110 may provide input to select the English language graphical keys 118A to compose a reply message, for instance, by gesturing at or near locations of PSD 112 at which keys 118A are displayed. UI module 120 may send information to keyboard module 122 about the selection of keys 118A. Keyboard module 122, using an English language decoder, may determine text based on the information about the selection of keys 118A. For example, keyboard module 122 may determine the text to be "es geht mir gut" which is meaningless in English, however, in German, translates to "I am doing well" in English.

Responsive to determining that a characteristic of the text satisfies a threshold for determining a target language of the text, a machine-learned model of keyboard module 122 may determine the target language of the text. For example, the language identification module of keyboard module 122 may require a sufficient amount of text (e.g., a minimum quantity of words or characters, a minimum byte length, etc.) before attempting to determine the target language of the text. By refraining from determining the target language unless the characteristic of the text satisfies the threshold, the language identification module may avoid wasting energy trying to compute the target language when doing so may not be very accurate. In the example of FIG. 1A, the language identification module of keyboard module 122 may determine that the length of the text is sufficient for determining a target language associated with it and in response, determine the language of the text to be German.

If the target language of the text is not different than a language associated with the English decoder, keyboard module 122 may output, for display, an indication of one or more first candidate words determined by the English decoder from the text. For example, if the language identification module of keyboard module 122 identifies the language associated with the text to be English, keyboard module 1222 may send information to UI module 120 that causes PSD 112 to display, within word-suggestion region 119A, one or more English language word suggestions that, keyboard module 122 has determined from the text.

If the target language of the text is different than the language associated with the English decoder keyboard module 122 may enable a German decoder and output, for display, an indication of one or more German candidate words determined by the German decoder from the text. In some examples, keyboard module 122 may automatically enable the German decoder and in other examples, keyboard module 122 may first prompt the user before enabling a different decoder.

For example, as shown in FIG. 1B, if the language identification module of keyboard module 122 identifies the language associated with the text to be German, keyboard module 122 may cause UI module 120 to display at PSD 112 graphical indication 117 that includes information for alerting the user that keyboard module 122 has determined the user's inputs to be for typing German whereas keyboard module 122 is configured to translate keyboard inputs into English. Graphical indication 117 indicates that keyboard module 122 has automatically enabled a German decoder but also provides the user an opportunity to revert the reconfiguration by either clicking the undo button or going into the settings menu to manually adjust the keyboard settings.

As shown in FIG. 1C, if the language identification module of keyboard module 122 identifies the language associated with the text to be German, keyboard module 1222 may send information to UI module 120 that causes PSD 112 to display, within word-suggestion region 119B, one or more German language word suggestions that, keyboard module 122 has determined from the text. Also shown in FIG. 1C, keyboard module 122, in response to determining the target language that is different than the language of the English decoder, may cause UI module 120 and PSD 112 to output, for display, German language graphical keys 118B that replace the English language graphical keys 118A. For example, keyboard module 122 may send information to UI module 120 that causes PSD 112 to display, within word-suggestion region 119B, one or more German language word suggestions that, keyboard module 122 has determined from the text. Keyboard module 122 may send further information to UI module 120 that causes PSD 112 change the layout of graphical keyboard 116 to be a German, as opposed to English, language graphical keyboard.

To enable the German decoder, keyboard module 122 may need to first download and install a decoder package associated with the target language. For example, keyboard module 122 may request, from data repository module 162, a German decoder package. In response to the request, keyboard module 122 may receive data that once unpackaged, causes keyboard module 122 to install and enable the German decoder package including the German keyboard decoder defined by the data.

Figure 2:
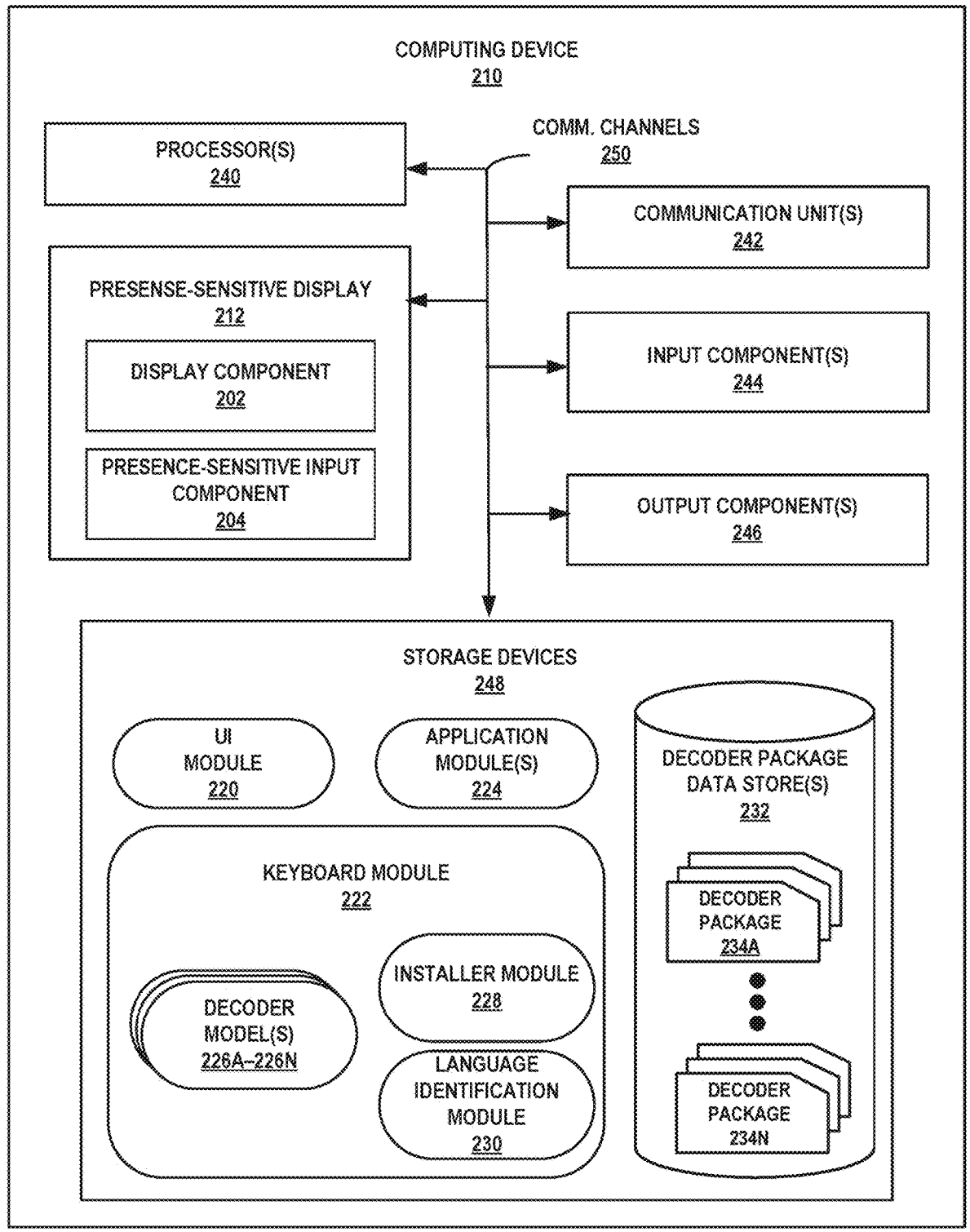
FIG. 2 is a block diagram illustrating an example computing device that includes a graphical keyboard configured to automatically reconfigure itself to decode user inputs into text of a target language determined based on the user inputs, in accordance with one or more aspects of the present disclosure.

FIG. 2 is a block diagram illustrating an example computing device that includes a graphical keyboard configured to automatically reconfigure itself to decode user inputs into text of a target language determined based on the user inputs, in accordance with one or more aspects of the present disclosure. Computing device 210 of FIG. 2 is described below as an example of computing device 110 of FIGS. 1A-1C. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes PSD 212, one or more processors 240, one or more communication units 242, one or more input components 244, one or more output components 246, and one or more storage components 248. Presence-sensitive display 212 includes display component 202 and presence-sensitive input component 204. Storage components 248 of computing device 210 include UI module 220, keyboard module 222, one or more application modules 224, and one or more decoder package data stores 232. Keyboard module 122 may include one or more decoder models 226A-226N (collectively "decoder models 226"), installer model 228, and language identification module 230. Communication channels 250 may interconnect each of the components 212, 240, 242, 244, 246, 248, 220, 222, 224, 226, 228, and 230 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 210 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

PSD 212 of computing device 210 may be similar to PSD 112 of computing device 110 and includes display component 202 and presence-sensitive input component 204. Display component 202 may be a screen at which information is displayed by PSD 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, PSD 212 may present a user interface (such as graphical user interfaces 114 of FIGS. 1A-1C).

While illustrated as an internal component of computing device 210, PSD 212 may also represent an external component that shares a data path with computing device 210 for transmitting and/or receiving input and output. For instance, in one example, PSD 212 represents a built-in component of computing device 210 located within and physically connected to the external packaging of computing device 210 (e.g., a screen on a mobile phone). In another example, PSD 212 represents an external component of computing device 210 located outside and physically separated from the packaging or housing of computing device 210 (e.g., a monitor, a projector, etc. that shares a wired and/or wireless data path with computing device 210).

PSD 212 of computing device 210 may detect two-dimensional and/or three-dimensional gestures as input from a user of computing device 210. For instance, a sensor of PSD 212 may detect a user's movement (e.g., moving a hand, an arm, a pen, a stylus, etc.) within a threshold distance of the sensor of PSD 212. PSD 212 may determine a two or three dimensional vector representation of the movement and correlate the vector representation to a gesture input (e.g., a hand-wave, a pinch, a clap, a pen stroke, etc.) that has multiple dimensions. In other words, PSD 212 can detect a multi-dimension gesture without requiring the user to gesture at or near a screen or surface at which PSD 212 outputs information for display. Instead, PSD 212 can detect a multi-dimensional gesture performed at or near a sensor which may or may not be located near the screen or surface at which PSD 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, 228, and 230 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, 228, and 230. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, 228, and 230 during execution at computing device 210). For example, one or more storage components 248 may store decoder information at decoder package data store 232 that, when unpackaged and installed by installer module 228 of keyboard module 222, enables keyboard module 222 to determine text, including candidate words in various languages, based on inputs at graphical keyboard 116B.

In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 224, 226, 228, and 230. Storage components 248 may include a memory configured to store data or other information associated with modules 220, 222, 224, 226, 228, and 230.

UI module 220 may include all functionality of UI module 120 of computing device 110 of FIGS. 1A-1C and may perform similar operations as UI module 120 for managing a user interface (e.g., user interfaces 114) that computing device 210 provides at presence-sensitive display 212 for handling input from a user. For example, UI module 220 of computing device 210 may query keyboard module 222 for a keyboard layout. UI module 220 may transmit a request for a keyboard layout over communication channels 250 to keyboard module 222. Keyboard module 222 may receive the request and reply to UI module 220 with data associated with the keyboard layout that keyboard module 222 determines is likely associated with a target language of a user. UI module 220 may receive the keyboard layout data over communication channels 250 and use the data to generate a user interface. UI module 220 may transmit a display command and data over communication channels 250 to cause PSD 212 to present the user interface at PSD 212.

In some examples, UI module 220 may receive an indication of one or more user inputs detected at PSD 212 and may output information about the user inputs to keyboard module 222. For example, PSD 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated the graphical keyboard. UI module 220 may send an indication of the one or more touch events to keyboard module 222 for further interpretation. Keyboard module 222 may determine, based on the touch events received from UI module 220, that the detected user input represents a selection of one or more keys of the graphical keyboard.

Application modules 224 represent all the various individual applications and services executing at and accessible from computing device 210 that may rely on a graphical keyboard. A user of computing device 210 may interact with a graphical user interface associated with one or more application modules 224 to cause computing device 210 to perform a function. Numerous examples of application modules 224 may exist and include, a fitness application, a calendar application, a personal assistant or prediction engine, a search application, a map or navigation application, a transportation service application (e.g., a bus or train tracking application), a social media application, a game application, an e-mail application, a chat or messaging application, an Internet browser application, or any and all other applications that may execute at computing device 210.

Keyboard module 222 may include all functionality of keyboard module 122 of computing device 110 of FIGS.

1A-1C and may perform similar operations as keyboard module 122 for providing a graphical keyboard configured to automatically reconfigure itself to decode user inputs into text of a target language determined based on the user inputs. Keyboard module 222 may include various submodules, such as one or more decoder modules 226, installer module 228, and language identification module 230, which may perform the functionality of keyboard module 222.

Decoder modules 226 determine text from inputs detected by PSD 112 at locations at which graphical keyboard 116B is displayed. A single module 226 from decoder modules 226 may include a spatial model, a language model, or any other component or model used by keyboard module 222 to determine text based on keyboard inputs. For example, decoder module 226A and decoder module 226N may each include a respective spatial model, a respective language model, and a respective lexicon of one or more word from a dictionary. Each of decoders 226 may be associated with a language. Decoder 226A may be associated with a particular language and decoder 226N may be associated with a different language.

Decoder module 226A may include a spatial model configured to receive one or more touch events as input, and output text as a character or sequence of characters that likely represents the one or more touch events, along with a degree of certainty or spatial model score indicative of how likely or with what accuracy the one or more characters define the touch events. In other words, the spatial model of decoder module 226A may infer touch events as a selection of one or more keys of a keyboard and may output, based on the selection of the one or more keys, a character or sequence of characters.

Decoder module 226A may include a language model configured to receive a character or sequence of characters as input, and output one or more candidate characters, words, or phrases that the language model identifies from a lexicon (e.g., a dictionary) as being potential replacements for a sequence of characters that the language model receives as input for a given language context (e.g., a sentence in a written language). Keyboard module 222 may cause UI module 220 to present one or more of the candidate words determined by a language model of decoder modes 226 at suggestion region 119A or 119B of user interfaces 114A or 114C.

Decoder module 226A may include one or more lexicons (e.g., dictionaries) of words of a language that decoder module 226A uses to perform traditional text-entry (e.g., auto-completion, auto-correction, spell check, word suggestion, etc.) operations. The lexicon may include a list of words within a written language vocabulary (e.g., a dictionary). For instance, the lexicon may include a database of words (e.g., words in a standard dictionary and/or words added to a dictionary by a user or computing device 210). A language model of decoder module 226A may perform a lookup in the lexicon, of a character string, to determine one or more letters, words, and/or phrases that include parts or all of the characters of the character string.

Decoder package data stores 232 is similar to and includes all the functionality of decoder package data stores 123. Decoder package data stores 232 includes decoder package 234A-234N (collectively "decoder packages 234"). Each of decoder packages 234 is associated with a different language and includes instructions that, when installed as part of keyboard module 222 (e.g., as one of decoder modules 226), enables keyboard module 222 to produce a keyboard layout in the language and decode keyboard inputs into the language associated with that decoder package. Installer module 228 is configured to install decoder packages 234 that are downloaded and/or stored at data store 232. Installer module 228 may unpackaged one of decoder packages 234 to produce a respective one of decoder modules 226.

For example, decoder package 234A may be associated with the Danish language. When decoder package 234A is installed and enabled by installer module 228, installer module 228 may generate decoder module 226A. Decoder module 226A of keyboard module 222 may cause PSD 212 to display a Danish keyboard layout for graphical keyboard 116B and may interpret inputs detected at keyboard 116B into text in the written Danish language.

Language identification module 230 is a machine-learned model (e.g., a long-short-term-memory-network or "LSTM network") executing as part of keyboard module 222 for determining what one or more target languages that a user is typing in when providing inputs at graphical keyboard 116, and whether any of the one or more target languages are unsupported by one of decoder modules 226. Language identification module 230 may be divided into multiple levels of technology that act together to determine what one or more target languages that a user is typing in when providing inputs at graphical keyboard 116.

A first level may be the core identification engine configured to return a probabilistic result (e.g., a probability or other numerical value indicative of a degree of likelihood) that classifies a piece of text into a particular language from a pre-defined set of languages known to module 230. For example, language identification module 230 may determine, for each of a plurality of potential languages, a respective degree of likelihood or probability that the potential language is the target language of the text. Language identification module 230 may determine that the one or more potential languages from the plurality of potential languages with the highest respective degree of likelihoods are the target languages of the text.

The machine-learned model of language identification module 230 may be any supervised machine learning model. In some examples however, to achieve high accuracy, certain types of models may be better than others. For example, while a larger model, like a translation model executing at a server to provide on-demand translation service to the Internet, a smaller model that condenses the information of a large model may execute faster and with less memory, processing, and/or storage requirements. A smaller model that is trained to mimic the outputs of a larger model may execute faster and cheaper (e.g., from a computing resources perspective). For example, a recurrent neural network, such as a LSTM network trained with a cross-entropy criterion to predict the corresponding language may be used to determine a language from text. Rather than require a long input stream of text and compare the input stream to a plurality of different languages, the LSTM can use shorter portions of text input and execute faster by simply approximating the larger model's output.

The machine-learned model of language identification module 230 may be trained on various types of user information, such as which application a user is currently using, a user's typing history, or other kinds of information that may improve a target language determination. Context information may be used (e.g., location and time of computing device 210, current activity being performed by the user of computing device 210, sensor information obtained by computing device 210, etc.) to train the machine-learned model of language identification module 230 to improve target language determinations.

Language identification module 230 may only make use of user information (e.g., content logs, user information, context information, etc.) about users of computing device 210 and/or users of other computing devices after receiving explicit permission to do so. In other words, language identification module 230 may be restricted from using information about a user to determine a target language, until computing device 210 obtains clear and unambiguous consent from the user to make use of and analyze information about the user and computing device 210. For example, computing device 210 may cause PSD 212 to present a prompt asking the user to affirmatively give permission for computing device 210 to evaluate information about the user, computing device 210, and information that computing device 210 receives that is to be presented to the user. The user may check a box in settings menu or affirmatively reply to the prompt to provide his or her consent. Computing device 210 may enable to the user to withdraw his or her consent at any time by unchecking the box or providing some other type of input to withdraw consent.

To reflect the real-world behavior of a large model, the model used by language identification module 230 may be trained based on data (e.g., content logs) received by keyboard applications executing at other computing devices. Said differently, the model of language identification module 230 may be trained based on user inputs (e.g., content logs) received by other keyboard applications executing at other computing devices. Language identification module 230 may be trained based on real-world data (e.g., content logs or other application data) obtained from keyboard applications executing on other computing devices to learn how users of the other computing devices provide inputs to their keyboards to type in a target language, without necessarily worrying about what the users are specifically typing (as far as content is concerned). In this way, language identification module 230, by executing a smaller model, need not necessarily translate text or compare the text to all the words of a plurality of languages to determine the target language of the input. Using machine-learning on the input, the model of language identification module 230 may determine the language of the text using rules trained on previous inputs to infer what language is a user's target language.

A second level of language identification module 230 may be a layer of restrictions to ensure that performance is balanced for accuracy. That is, language identification module 230 may refrain from determining the target language of text inputs unless it determines a characteristic of the text satisfies a threshold for determining the target language of the text. The characteristic of the text may be a byte-length of the text, a minimum number of words associated with the text (e.g., as defined by a quantity of space delimiters in the text), and/or an average log probability associated with a frame of the text. Language identification module 230 may tune thresholds associated with one or more of these characteristics to achieve a balance of performance and accuracy.

Figure 3:
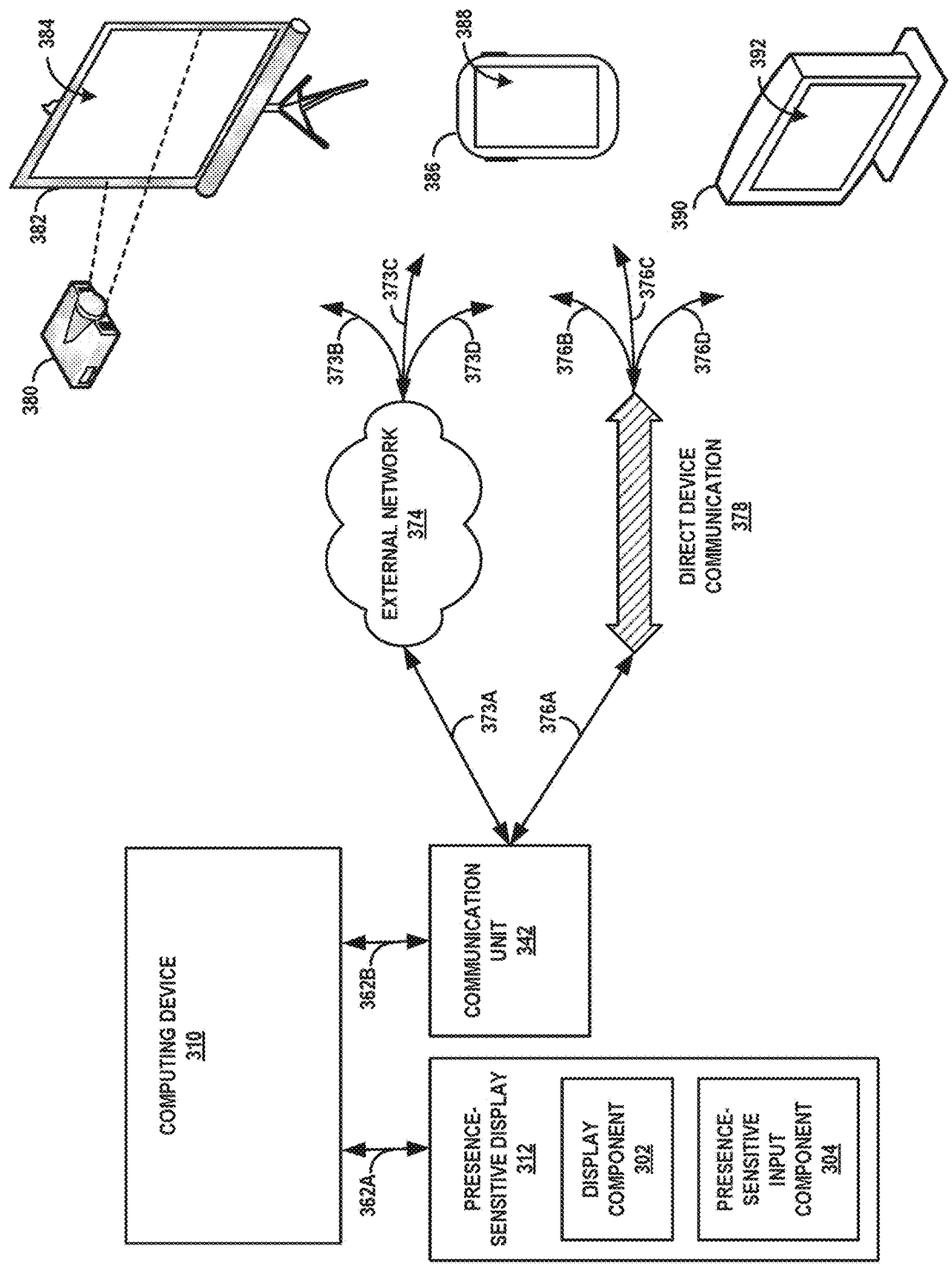
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone computing device 110 and 210, respectively, a computing device such as computing device 310 may, generally, be any component or system that includes a processor or other suitable computing environment for executing software instructions and, for example, need not include a presence-sensitive display.

As shown in the example of FIG. 3, computing device 310 may be a processor that includes functionality as described with respect to processors 240 in FIG. 2. In such examples, computing device 310 may be operatively coupled to PSD 312 by a communication channel 362A, which may be a system bus or other suitable connection. Computing device 310 may also be operatively coupled to communication unit 342, further described below, by a communication channel 362B, which may also be a system bus or other suitable connection. Although shown separately as an example in FIG. 3, computing device 310 may be operatively coupled to PSD 312 and communication unit 342 by any number of one or more communication channels.

In other examples, such as illustrated previously by computing devices 110 and 210 in FIGS. 1 and 2, respectively, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from computing device 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to computing device 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, computing device 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with computing device 310. In some examples, the one or more communication units may enable communication between projector 380 and projector screen 382. Projector 380 may receive data from computing device 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to computing device 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 384. Presence-sensitive display 384 may include a subset of functionality or all of the functionality of presence-sensitive display 112, 212, and/or 312 as described in this disclosure. In some examples, presence-sensitive display 384 may include additional functionality. Projector screen 382 (e.g., an electronic whiteboard), may receive data from computing device 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to computing device 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from computing device 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from computing device 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to computing device 310.

As described above, in some examples, computing device 310 may output graphical content for display at PSD 312 that is coupled to computing device 310 by a system bus or other suitable communication channel Computing device 310 may also output graphical content for display at one or more remote devices, such as projector 380, projector screen 382, mobile device 386, and visual display component 390. For instance, computing device 310 may execute one or more instructions to generate and/or modify graphical content in accordance with techniques of the present disclosure. Computing device 310 may output the data that includes the graphical content to a communication unit of computing device 310, such as communication unit 342. Communication unit 342 may send the data to one or more of the remote devices, such as projector 380, projector screen 382, mobile device 386, and/or visual display component 390. In this way, computing device 310 may output the graphical content for display at one or more of the remote devices. In some examples, one or more of the remote devices may output the graphical content at a presence-sensitive display that is included in and/or operatively coupled to the respective remote devices.

In some examples, computing device 310 may not output graphical content at PSD 312 that is operatively coupled to computing device 310. In other examples, computing device 310 may output graphical content for display at both a PSD 312 that is coupled to computing device 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 310 and output for display at PSD 312 may be different than graphical content display output for display at one or more remote devices.

Computing device 310 may send and receive data using any suitable communication techniques. For example, computing device 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between computing device 310 and the remote devices illustrated in FIG. 3. In some examples, network links 373A-373D may be Ethernet, ATM or other network connections. Such connections may be wireless and/or wired connections.

In some examples, computing device 310 may be operatively coupled to one or more of the remote devices included in FIG. 3 using direct device communication 378. Direct device communication 378 may include communications through which computing device 310 sends and receives data directly with a remote device, using wired or wireless communication. That is, in some examples of direct device communication 378, data sent by computing device 310 may not be forwarded by one or more additional devices before being received at the remote device, and vice-versa. Examples of direct device communication 378 may include Bluetooth, Near-Field Communication, Universal Serial Bus, WiFi, infrared, etc. One or more of the remote devices illustrated in FIG. 3 may be operatively coupled with computing device 310 by communication links 376A-376D. In some examples, communication links 376A-376D may be connections using Bluetooth, Near-Field Communication, Universal Serial Bus, infrared, etc. Such connections may be wireless and/or wired connections.

In accordance with techniques of the disclosure, computing device 310 may be operatively coupled to visual display component 390 using external network 374. Computing device 310 may output, for display at PSD 312, a graphical user interface including an edit region and a graphical keyboard the graphical keyboard including a plurality of. For instance, computing device 310 may send data that includes a representation of the graphical user interface to communication unit 342. Communication unit 342 may send the data that includes the representation of the graphical user interface to visual display component 390 using external network 374. Visual display component 390, in response to receiving the data using external network 374, may cause PSD 312 to output the graphical user interface. In response to receiving a user input at PSD 312 to select one or more keys of the keyboard of the graphical user interface, visual display device 130 may send an indication of the selection of the one or more keys to computing device 310 using external network 374. Communication unit 342 of may receive the indication of the selection of the one or more keys, and send the indication of the selection of the one or more keys to computing device 310.

While receiving the indication of the selection of the one or more keys, computing device 310 may determine, using a first decoder of a keyboard application executing at computing device 310 and based on a selection of one or more keys of the graphical keyboard, text. Responsive to determining that a characteristic of the text satisfies a threshold for determining a target language of the text, a machine-learned model of the keyboard application executing at computing device 310 may determine the target language of the text.

If the target language of the text is not different than a language associated with the first decoder, computing device 310 may output, for display, an indication of one or more first candidate words determined by the first decoder from the text. For example, computing device 310 may send an updated representation of the graphical user interface that includes the one or more candidate words written in the language of the first decoder, within a suggestion region of the graphical keyboard. Communication unit 342 may receive the representation of the updated graphical user interface and may send the updated representation to visual display component 390, such that visual display component 390 may cause PSD 312 to output the updated graphical user interface, including the candidate words displayed within the suggestion region of the graphical keyboard.

If the target language of the text is different than the language associated with the first decoder: computing device 310 may enable a second decoder of the keyboard application wherein has a language associated with the second decoder matches the target language of the text, and may output, for display, an indication of one or more second candidate words determined by the second decoder from the text. For example, computing device 310 may send an updated representation of the graphical user interface that includes the one or more candidate words written in the language of the second decoder within the suggestion region of the graphical keyboard. Computing device 310 may also send an updated layout of the graphical keys that is associated with the language of the second decoder. Communication unit 342 may receive the representation of the updated graphical user interface and may send the updated representation to visual display component 390, such that visual display component 390 may cause PSD 312 to output the updated graphical user interface, including the candidate words displayed within the suggestion region of the graphical keyboard and the updated layout of the graphical keys.

Figure 4:
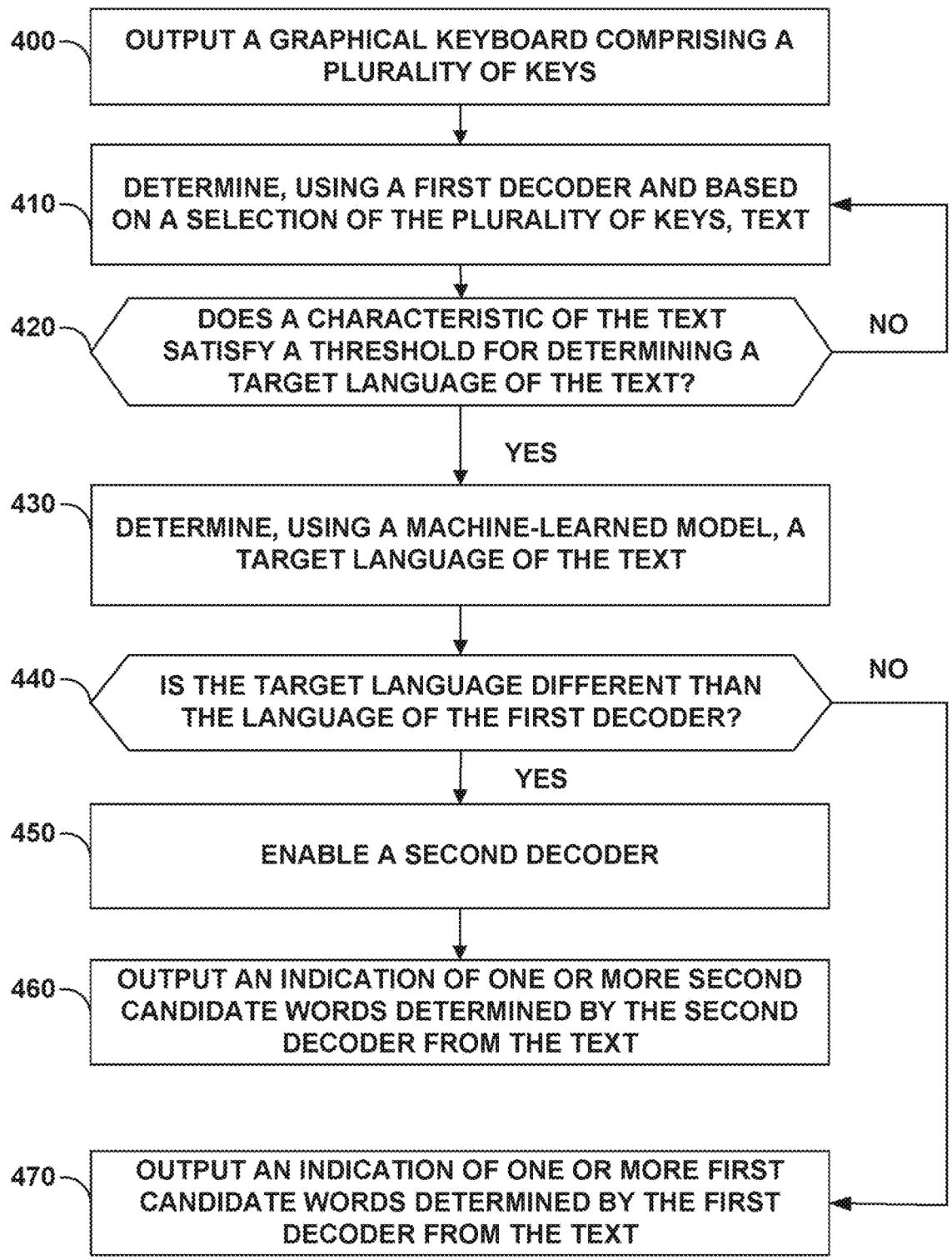
FIG. 4 is a flowchart illustrating example operations of a computing device that includes a graphical keyboard configured to automatically reconfigure itself to decode user inputs into text of a target language determined based on the user inputs, in accordance with one or more aspects of the present disclosure.

FIG. 4 is a flowchart illustrating example operations of a computing device that includes a graphical keyboard configured to automatically reconfigure itself to decode user inputs into text of a target language determined based on the user inputs, in accordance with one or more aspects of the present disclosure. The operations of FIG. 4 may be performed by one or more processors of a computing device, such as computing devices 110 of FIG. 1 or computing device 210 of FIG. 2. For purposes of illustration only, FIG. 4 is described below within the context of computing devices 110 of FIGS. 1A-1C.

In operation, computing device 110 may output, for display, a graphical keyboard (400). For example, keyboard module 122 may send instructions to UI module 120 that causes PSD 112 to present user interface 114A.

Computing device 110 may determine, using a first decoder and based on a selection of one or more keys of the graphical keyboard, text (410). For example, using an English language decoder, keyboard module 122 may process input information received from UI module 120 about touch inputs detected at PSD 112 at or near locations of PSD 112 at which graphical keys 118A are displayed.

Computing device 110 may determine whether a characteristic of the text satisfies a threshold for determining a target language of the text (420). For example, keyboard module 122 may determine whether the user has provided sufficient text input to make verifying the language configuration of keyboard module 122 a worthwhile and not overly consuming process that could detract from usability or efficiency of the system. Keyboard module 122 may determine, after detecting a sufficient quantity of text (e.g., minimum quantity of words and/or byte-length), to verify whether the decoder being used matches the target language of the input (420, YES branch). Otherwise, computing device 110 will continue to determine text using the first decoder (420, NO branch).

Responsive to determining that the characteristic of the text satisfies the threshold for determining the target language of the text, computing device 110 may determine, using a machine-learned model, the target language of the text (430). For example, a LSTM network of keyboard module 122 may determine the target language of the text using rules developed from content log data obtained and analyzed from keyboard applications executing at other devices. The LSTM network may approximate the output of a large-scale machine-learning system executing at a remote computing device without necessarily performing the same analysis on the text input.

Computing device 110 may determine whether the target language is different than the first decoder (440). If the target language of the text is not different than a language associated with the first decoder (440, NO branch), computing device 110 may output an indication of one or more first candidate words determined by the first decoder from the text (470). In other words, if the determined language corresponds to the language of the decoder used by keyboard module 122, keyboard module 122 may cause UI module 120 to display candidate words determined by the first decoder at PSD 112.

If the target language of the text is different than the language associated with the first decoder (440, YES branch), computing device 110 may enable a second decoder (450), wherein a language associated with the second decoder matches the target language of the text, and output an indication of one or more second candidate words determined by the second decoder from the text (460). For example, keyboard module 122 may enable a different decoder that can handle processing input in the target language. In some cases, keyboard module 122 may output a graphical indication to allow the user to approve or deny the enablement of the second decoder.

In some examples, computing device 110 may enable the second decoder by downloading, by the keyboard application, from a remote computing system, a decoder package that includes instructions for executing the second decoder, and installing, by the keyboard application, the decoder package. For example, keyboard module 122 may request and obtain a decoder package from ISS 160 and in response to obtaining the decoder package, unpack and install the decoder defined by the package so that subsequent text can be decoded using the decoder from the newly obtained and installed decoder package.

Figure 5:
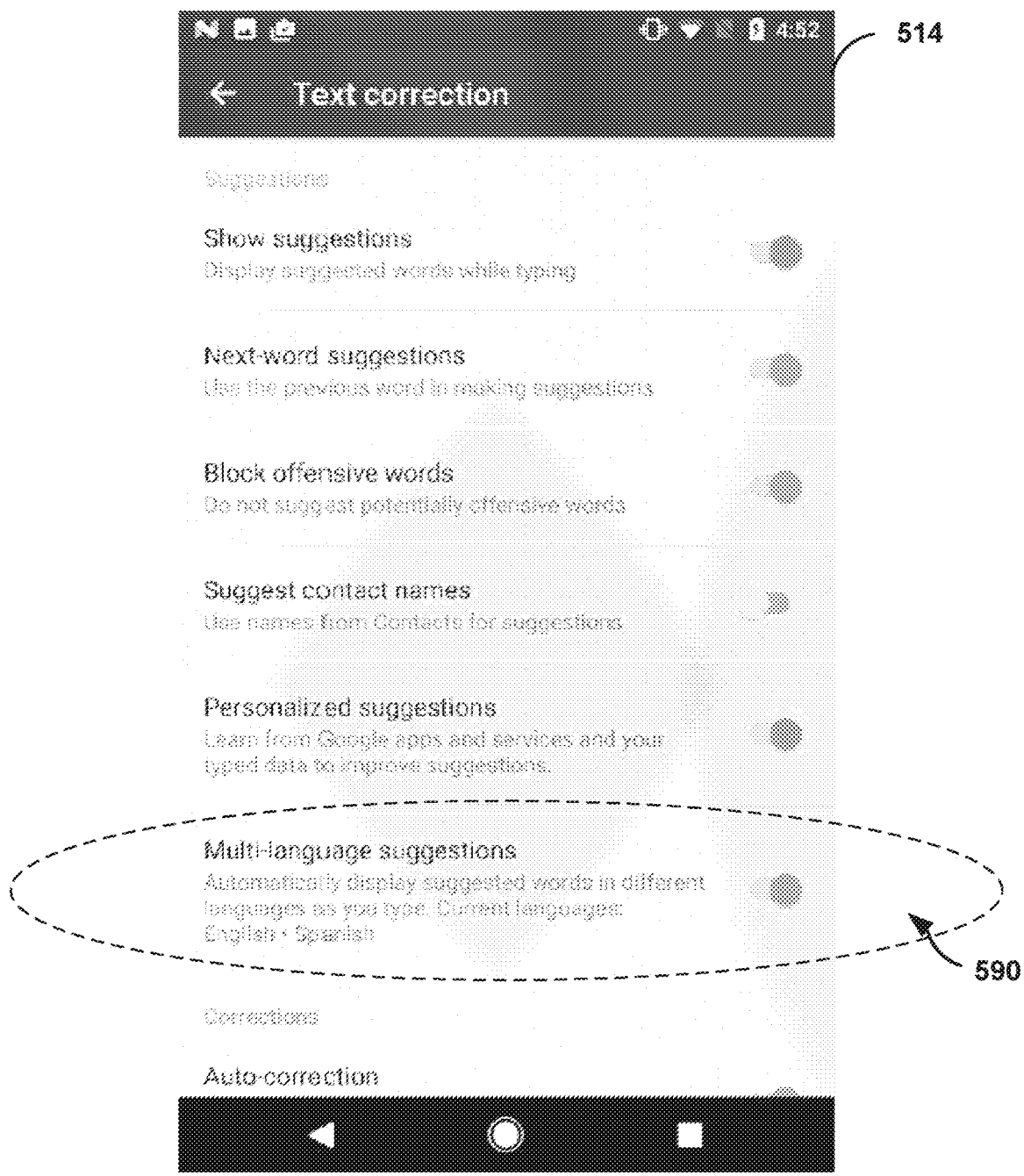
FIGS. 5-7 are conceptual diagrams illustrating example graphical user interfaces of an example computing device that includes a graphical keyboard configured to automatically reconfigure itself to decode user inputs into text of a target language determined based on the user inputs, in accordance with one or more aspects of the present disclosure.
Figure 6:
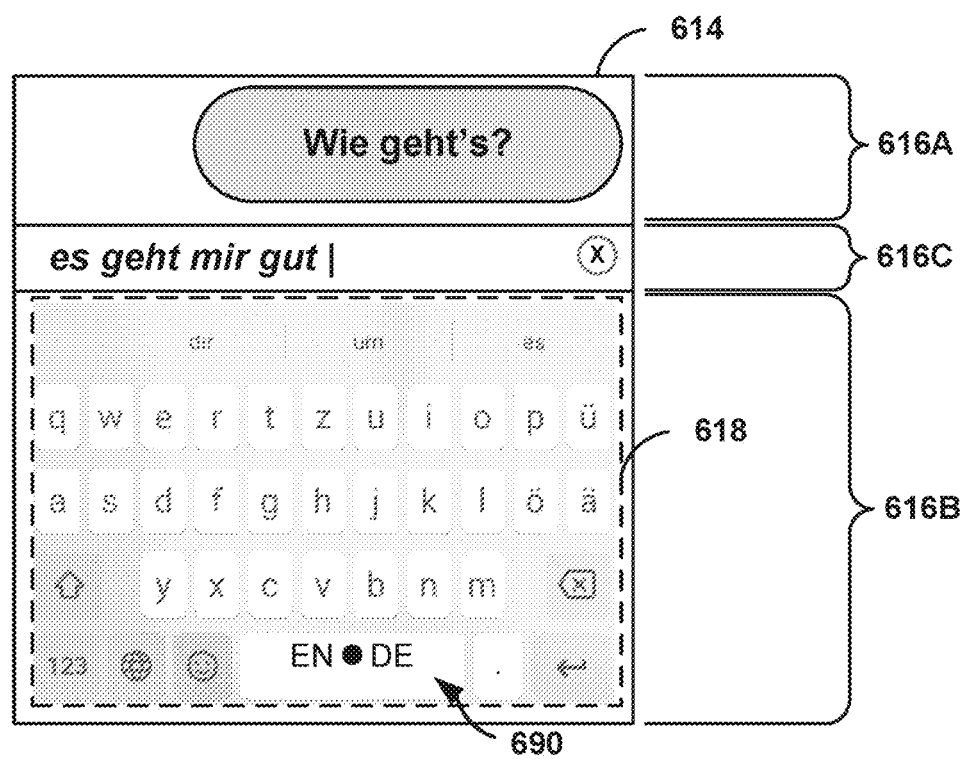
Figure 7:
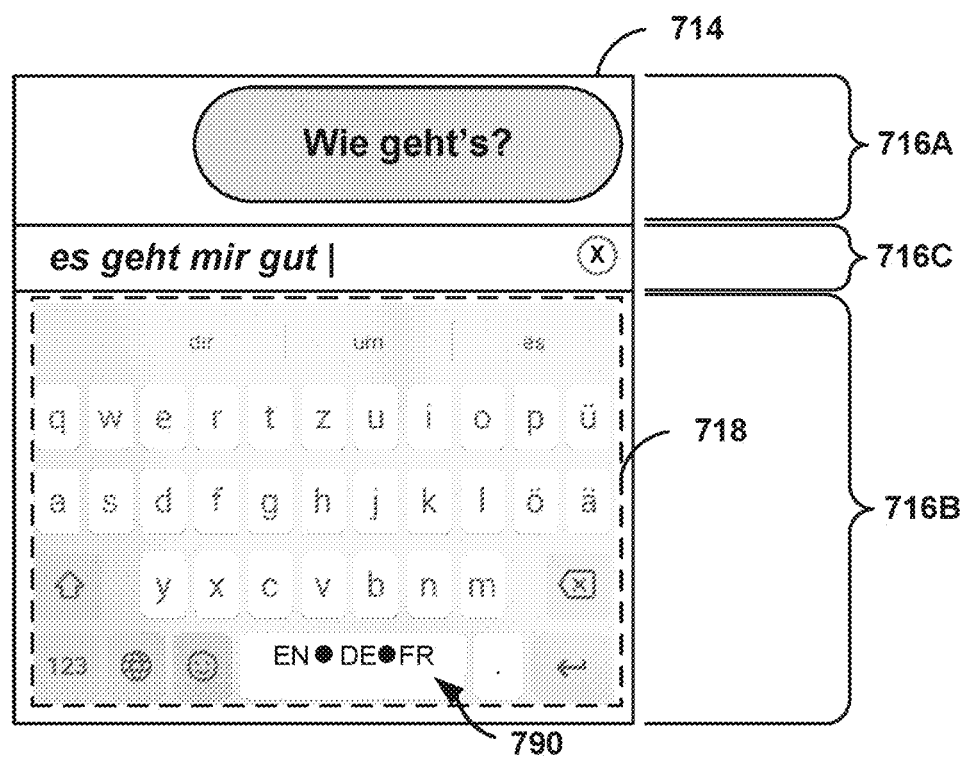

FIGS. 5-7 are conceptual diagrams illustrating example graphical user interfaces of an example computing device that includes a graphical keyboard configured to automatically reconfigure itself to decode user inputs into text of a target language determined based on the user inputs, in accordance with one or more aspects of the present disclosure. FIGS. 5-7 illustrate, respectively, example user interfaces 514, 614, and 714. Each of user interfaces 514, 614, and 714 may correspond to a graphical user interface displayed by computing devices 110, 210, or 310 of FIGS. 1, 2, and 3 respectively.

FIG. 5 shows an example user interface 514 that represents a page of a settings menu associated with computing device 110 and/or keyboard module 122. As shown in settings option 590, a user may be provided with an opportunity to control whether keyboard module 122 analyzes the keyboard inputs detected at PSD 112 for a language. By selecting option 590, the user may enable target language detection and by unselecting option 590, the user may disable target language detection.

FIG. 6 shows an example user interface 614 that includes output region 616A, edit region 616C, and graphical keyboard 616B. User interface 614 shows how, after determining that the target language of the text inferred from inputs at a first graphical keyboard, keyboard module 122 may cause UI module 120 and UID 112 to display a second graphical keyboard associated with the target language that replaces the first graphical keyboard. In other words, if the graphical keyboard initially shown by computing device 110 was an English language keyboard (e.g., 116B), keyboard module 122 may cause computing device 110 to display a German language keyboard 616B that replaces the English language keyboard. As shown in the example of FIG. 6, spacebar key 690 of graphical keys 618 includes an indication the target language and the language of the first decoder to indicate that one or more decoders are enabled.

FIG. 7 shows user interface 714 that includes output region 716A, edit region 716C, and graphical keyboard 716B. User interface 714 shows how after determining that the target language of the text inferred from inputs differs from the decoder, and then after enabling a second decoder to correspond to the target language, computing device 110 may determine at least one other target language of text inferred from user inputs and may enable the at least one third decoder in response. In other words, keyboard module 122 may periodically determine whether the target language of user inputs corresponds to one of the enabled decoders and if not, keyboard module 122 may enable a decoder to handle it. As shown in the example of FIG. 7, spacebar key 790 of graphical keys 718 includes an indication of three decoders (EN, DE, and FR) being enabled simultaneously in response to determining that the user of computing device 110 is multilingual and typing in each of English, German, and French, at user interface 714.

The following numbered clauses may illustrate one or more aspects of the disclosure:

Clause 1. A method comprising: outputting, by a keyboard application executing at a computing device, for display, a graphical keyboard; determining, by the keyboard application, using a first decoder and based on a selection of one or more keys of the graphical keyboard, text; responsive to determining that a characteristic of the text satisfies a threshold for determining a target language of the text, determining, by a machine-learned model of the keyboard application, the target language of the text; determining whether the target language is different than a language associated with the first decoder; if the target language of the text is not different than a language associated with the first decoder, outputting, by the keyboard application, for display, an indication of one or more first candidate words determined by the first decoder from the text; and if the target language of the text is different than the language associated with the first decoder: enabling, by the keyboard application, a second decoder, wherein a language associated with the second decoder matches the target language of the text; and outputting, by the keyboard application, for display, an indication of one or more second candidate words determined by the second decoder from the text.

Clause 2. The method of clause 1, further comprising: training, by the keyboard application, the machine-learned model based on user inputs received by other keyboard applications executing at other computing devices, wherein the second decoder was enabled by at least some of the other keyboard applications while receiving the user inputs.

Clause 3. The method of any one of clauses 1 or 2, wherein the characteristic of the text is a byte-length of the text.

Clause 4. The method of any one of clauses 1-3, wherein the characteristic of the text is a minimum number of words associated with the text.

Clause 5. The method of any one of clauses 1-4, wherein the characteristic of the text is an average log probability associated with the text.

Clause 6. The method of any one of clauses 1-5, wherein determining the target language of the text comprises: determining, by the machine-learned model, for each of a plurality of potential languages, a respective degree of likelihood that the potential language is the target language of the text; and determining, by the machine-learned model, that the potential language from the plurality of potential languages with the highest respective degree of likelihood is the target language of the text.

Clause 7. The method of any one of clauses 1-6, wherein the machine-learned model is a long short-term memory network.

Clause 8. The method of any one of clauses 1-7, wherein enabling the second decoder comprises: downloading, by the keyboard application, from a remote computing system, a decoder package that includes instructions for executing the second decoder; and installing, by the keyboard application, the decoder package.

Clause 9. The method of any one of clauses 1-8, wherein the graphical keyboard comprises a first graphical keyboard associated with the language of the first decoder, the method further comprising: outputting, by the keyboard application, for display, a second graphical keyboard associated with the target language that replaces the first graphical keyboard.

Clause 10. The method of clause 9, wherein a respective character of at least one key of the second graphical keyboard is different than a respective character of a corresponding key of the first graphical keyboard.

Clause 11. The method of any one of clauses 9 or 10, wherein a spacebar key of the second graphical keyboard includes an indication the target language.

Clause 12. The method of clause 11, wherein the spacebar key of the second graphical keyboard further includes an indication the language of the first decoder.

Clause 13. The method of any one of clauses 1-13, further comprising: enabling, by the keyboard application, at least one third decoder in response to determining at least one other target language of the text.

Clause 14. The method of any one of clauses 1-13, wherein enabling the second decoder comprises: outputting, by the keyboard application, for display, a graphical indication overlaying at least a portion of the graphical keyboard indicating that the second decoder is enabled.

Clause 15. A mobile device comprising: a presence-sensitive display component; at least one processor; and a memory that stores instructions for a keyboard application that, when executed, cause the at least one processor to: output, for display at the presence-sensitive display, a graphical keyboard; determine, using a first decoder and based on a selection of one or more keys of the graphical keyboard, text; responsive to determining that a characteristic of the text satisfies a threshold for determining a target language of the text, determine, using a machine-learned model, the target language of the text; determine whether the target language is different than the language associated with the first decoder; if the target language of the text is not different than a language associated with the first decoder, output, for display at the presence-sensitive display, an indication of one or more first candidate words determined by the first decoder from the text; and if the target language of the text is different than the language associated with the first decoder: enable, a second decoder, wherein a language associated with the second decoder matches the target language of the text; and output, for display at the presence-sensitive display, an indication of one or more second candidate words determined by the second decoder from the text.

Clause 16. The mobile device of clause 15, wherein the instructions, when executed, further cause the at least one processor to train the machine-learned model based on user inputs received by other keyboard applications executing at other computing devices, wherein the second decoder was enabled by at least some of the other keyboard applications while receiving the user inputs.

Clause 17. The mobile device of any one of clauses 15 or 16, wherein the characteristic of the text is a byte-length of the text or a minimum number of words associated with the text.

Clause 18. A computer-readable storage medium comprising instructions for a keyboard application that when executed cause at least one processor of a computing device to: output, for display, a graphical keyboard; determine, using a first decoder and based on a selection of one or more keys of the graphical keyboard, text; responsive to determining that a characteristic of the text satisfies a threshold for determining a target language of the text, determine, using a machine-learned model, the target language of the text; determine whether the target language is different than a language associated with the first decoder; if the target language of the text is not different than the language associated with the first decoder, output, for display, an indication of one or more first candidate words determined by the first decoder from the text; and if the target language of the text is different than the language associated with the first decoder: enable, a second decoder, wherein a language associated with the second decoder matches the target language of the text; and output, for display, an indication of one or more second candidate words determined by the second decoder from the text.

Clause 19. The computer-readable storage medium of clause 18, wherein the instructions, when executed, further cause the at least one processor to train the machine-learned model based on user inputs received by other keyboard applications executing at other computing devices, wherein the second decoder was enabled by at least some of the other keyboard applications while receiving the user inputs.

Clause 20. The computer-readable storage medium of any one of clauses 18 or 19, wherein the characteristic of the text is a byte-length of the text or a minimum number of words associated with the text.

Clause 21. A system comprising means for performing any of the methods of clauses 1-14.

Clause 22. A computing device comprising means for performing any of the methods of clauses 1-14.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    outputting, by a keyboard application executing at a computing device and for display, a first graphical keyboard in a bottom portion of a presence-sensitive display of the computing device, the first graphical keyboard associated with a first language and having a first layout of keys;
    determining, by the keyboard application, using a first decoder associated with the first language and based on a selection of one or more keys of the first graphical keyboard, text, the text output for display in an edit region of the presence-sensitive display above the first graphical keyboard;
    responsive to determining that a characteristic of the text satisfies a threshold for determining a target language of the text, determining, by a machine-learned model of the keyboard application executing at the computing device, the target language of the text, the machine-learned model using rules trained on previous inputs received by the keyboard application to infer the target language of the text from the text;
    determining, by the machine-learned model executing at the computing device, whether the target language is different than the first language associated with the first graphical keyboard and the first decoder;
    based on the target language of the text not being different than the first language, outputting, by the keyboard application, for display in a suggestion region of the presence-sensitive display, an indication of one or more first candidate words determined by the first decoder from the text, the suggestion region above the first graphical keyboard and below the edit region; and
    based on the target language of the text being different than the first language:
        enabling, by the keyboard application, a second decoder associated with a second language, wherein the second language matches the target language of the text; and
        outputting, by the keyboard application and for display in the suggestion region, an indication of one or more second candidate words determined by the second decoder from the text.

2. The method of claim 1, the method further comprising:
    determining, by the machine-learned model executing at the computing device, whether a second target language of second text is different than the first language and the second language; and
    based on the second target language of the second text being different than the first language and the second language:
        enabling, by the keyboard application, a third decoder associated with a third language, wherein the third language matches the second target language of the second text; and
        outputting, by the keyboard application and for display in the suggestion region, an indication of one or more third candidate words determined by the third decoder from the second text.

3. The method of claim 1, the method further comprising:
    responsive to the target language of the text being different than the first language, outputting, by the keyboard application and for display, a second graphical keyboard associated with the second language that replaces the first graphical keyboard, the second graphical keyboard having a second layout of keys associated with the second language that is different than the first layout of keys.

4. The method of claim 3, wherein a respective character of at least one key of the second graphical keyboard is different than a respective character of a corresponding key of the first graphical keyboard.

5. The method of claim 3, wherein the spacebar key of the second graphical keyboard includes an indication of the second language.

6. The method of claim 5, wherein the spacebar key of the second graphical keyboard further includes an indication of the first language.

7. The method of claim 1, wherein a spacebar key of the first graphical keyboard includes an indication of the first language.

8. The method of claim 1, the method further comprising:
    responsive to the target language of the text being different than the first language, outputting, by the keyboard application and for display in the suggestion region, an indication of one or more third candidate words determined by the first decoder.

9. A mobile device comprising:
    a presence-sensitive display component;
    at least one processor; and
    a memory that stores instructions for a keyboard application and a machine-learned model of the keyboard application that, when executed at the mobile device, cause the at least one processor to:
        output, for display at the presence-sensitive display, a first graphical keyboard in a bottom portion of the presence-sensitive display, the first graphical keyboard associated with a first language and having a first layout of keys;
        determine, using a first decoder associated with the first language and based on a selection of one or more keys of the first graphical keyboard, text, the text output for display in an edit region at the presence-sensitive display above the first graphical keyboard;
        responsive to determining that a characteristic of the text satisfies a threshold for determining a target language of the text, determine, using the machine-learned model executing at the mobile device, the target language of the text, the machine-learned model configured to use rules trained on previous inputs received by the keyboard application to infer the target language of the text from the text;

determine, using the machine-learned model executing at the mobile device, whether the target language is different than the first language associated with the first graphical keyboard and the first decoder;
if the target language of the text is not different than the first language, output, for display in a suggestion region at the presence-sensitive display, an indication of one or more first candidate words determined by the first decoder from the text, the suggestion region above the first graphical keyboard and below the edit region; and
if the target language of the text is different than the first language:
enable a second decoder associated with a second language, wherein the second language matches the target language of the text; and
output, for display in the suggestion region at the presence-sensitive display, an indication of one or more second candidate words determined by the second decoder from the text.

10. The mobile device of claim 9, wherein the instructions, when executed, further cause the at least one processor to:
determine, by the machine-learned model executing at the mobile device, whether a second target language of second text is different than the first language and the second language; and
if the second target language of the second text is different than the first language and the second language:
enable a third decoder associated with a third language, wherein the third language matches the second target language of the second text; and
output, for display in the suggestion region, an indication of one or more third candidate words determined by the third decoder from the second text.

11. The mobile device of claim 9, wherein if the target language of the text is different than the first language, the instructions, when executed, further cause the at least one processor to output, for display, a second graphical keyboard associated with the second language that replaces the first graphical keyboard, the second graphical keyboard having a second layout of keys associated with the second language that is different than the first layout of keys.

12. The mobile device of claim 11, wherein a respective character of at least one key of the second graphical keyboard is different than a respective character of a corresponding key of the first graphical keyboard.

13. The mobile device of claim 11, wherein the spacebar key of the second graphical keyboard includes an indication of the second language.

14. The mobile device of claim 13, wherein the spacebar key of the second graphical keyboard further includes an indication of the first language.

15. The mobile device of claim 9, wherein a spacebar key of the first graphical keyboard includes an indication of the first language.

16. The mobile device of claim 9, wherein if the target language of the text is different than the first language, the instructions, when executed, further cause the at least one processor to output, for display in the suggestion region, an indication of one or more third candidate words determined by the first decoder.

17. A non-transitory computer-readable storage medium comprising instructions for a keyboard application and a machine-learned model of the keyboard application that, when executed at a computing device, cause at least one processor of the computing device to:
output, for display at a presence-sensitive display of the computing device, a first graphical keyboard in a bottom portion of the presence-sensitive display, the first graphical keyboard associated with a first language and having a first layout of keys;
determine, using a first decoder associated with the first language and based on a selection of one or more keys of the first graphical keyboard, text, the text output for display in an edit region at the presence-sensitive display above the first graphical keyboard;
responsive to determining that a characteristic of the text satisfies a threshold for determining a target language of the text, determine, using the machine-learned model executing at the computing device, the target language of the text, the machine-learned model configured to use rules trained on previous inputs received by the keyboard application to infer the target language of the text from the text;
determine, using the machine-learned model executing at the computing device, whether the target language is different than the first language associated with the first graphical keyboard and the first decoder;
if the target language of the text is not different than the first language, output, for display in a suggestion region at the presence-sensitive display, an indication of one or more first candidate words determined by the first decoder from the text, the suggestion region above the first graphical keyboard and below the edit region; and
if the target language of the text is different than the first language:
enable a second decoder associated with a second language, wherein the second language matches the target language of the text; and
output, for display in the suggestion region at the presence-sensitive display, an indication of one or more second candidate words determined by the second decoder from the text.

18. The non-transitory computer-readable storage medium of claim 17, wherein the instructions, when executed, further cause the at least one processor to:
determine, by the machine-learned model executing at the computing device, whether a second target language of second text is different than the first language and the second language; and
if the second target language of the second text is different than the first language and the second language:
enable a third decoder associated with a third language, wherein the third language matches the second target language of the second text; and
output, for display in the suggestion region, an indication of one or more third candidate words determined by the third decoder from the second text.

19. The non-transitory computer-readable storage medium of claim 17, wherein a spacebar key of the first graphical keyboard includes an indication of the first language.

20. The non-transitory computer-readable storage medium of claim 17, wherein if the target language of the text is different than the first language, the instructions, when executed, further cause the at least one processor to output, for display in the suggestion region, an indication of one or more third candidate words determined by the first decoder.

* * * * *